Figure 1:
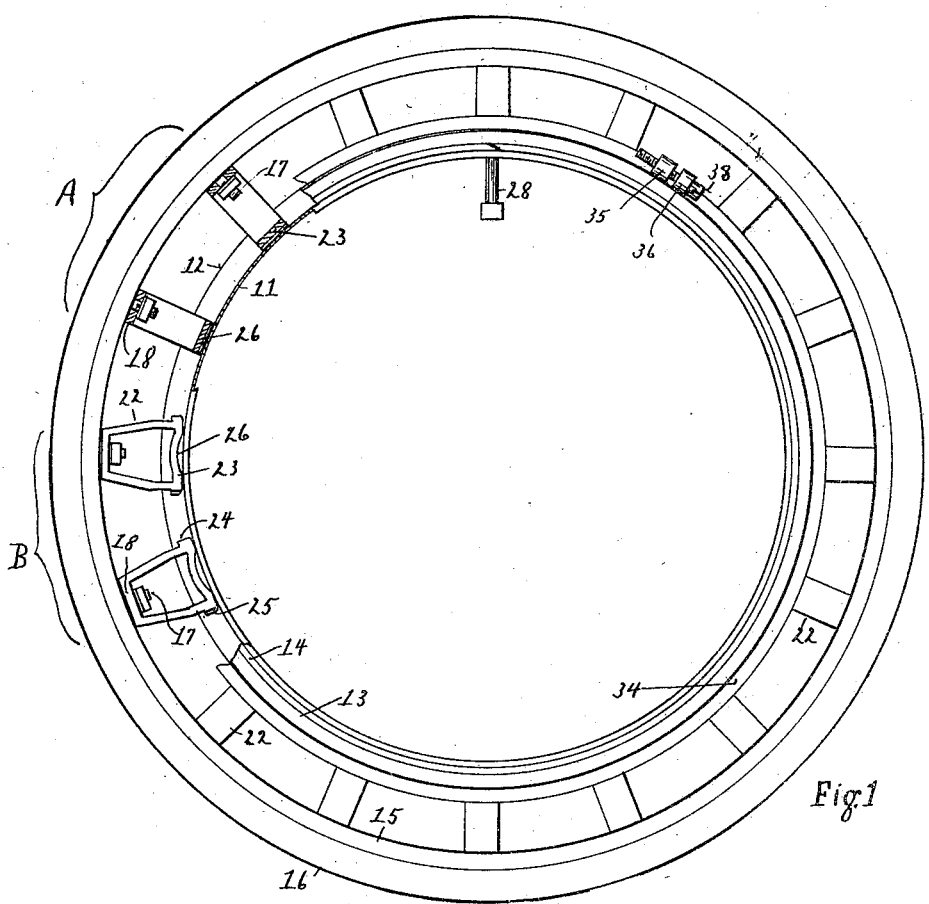

S. DAVIDSON.
EMERGENCY TIRE FOR AUTOMOBILES.
APPLICATION FILED JULY 5, 1912.

1,052,801.

Patented Feb. 11, 1913.
2 SHEETS—SHEET 1.

Witnesses

Inventor
Samuel Davidson

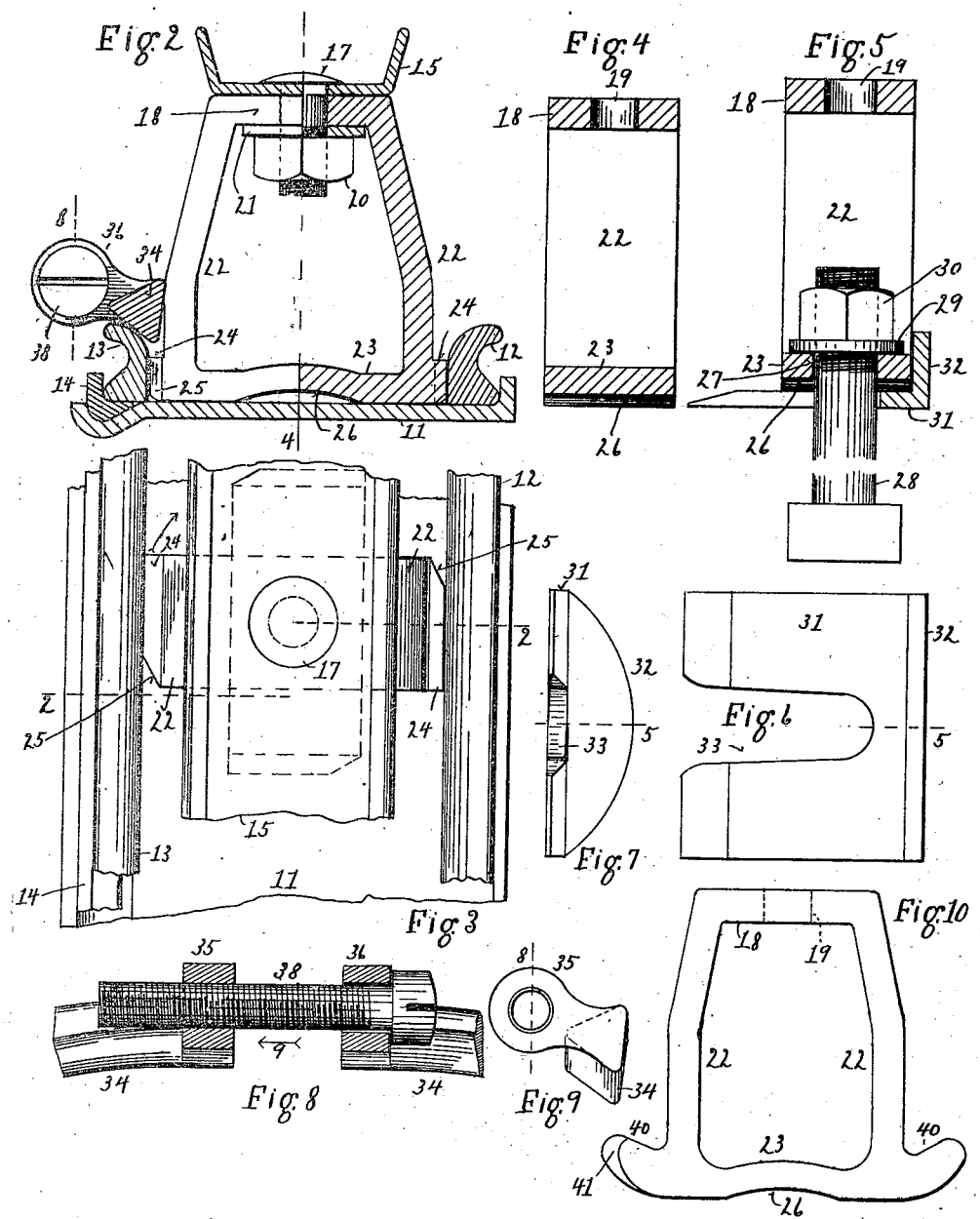

UNITED STATES PATENT OFFICE.

SAMUEL DAVIDSON, OF DETROIT, MICHIGAN.

EMERGENCY-TIRE FOR AUTOMOBILES.

1,052,801. Specification of Letters Patent. Patented Feb. 11, 1913.

Application filed July 5, 1912. Serial No. 707,690.

*To all whom it may concern:*

Be it known that I, SAMUEL DAVIDSON, a citizen of the United States, residing at Detroit, in the county of Wayne and State of Michigan, have invented certain new and useful Improvements in Emergency - Tires for Automobiles, of which the following is a specification.

In an application filed by me July 10, 1911, Serial No. 637,669, for an emergency tire for automobiles, I have explained at length the purposes and principles concerned in the art to which this invention relates; and in that application I have claimed certain features which are shown but not claimed in this application.

My present invention comprises a further improvement in emergency tires of the general nature described in said previous application. Its object is to improve generally upon such devices and the several parts thereof; to provide for more easily applying the tire to and removing it from the rim; to provide for holding it more securely on the rim; to provide special brackets swiveled to the tire proper and in connection therewith a retaining ring that is wedge shaped in cross section; and to provide a special means of preventing the swiveled brackets from turning when properly in position on the wheel. And my invention consists of the parts, improvements, and combinations hereinafter set forth and claimed.

In the drawings accompanying and forming part of this specification, and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a side elevation of an emergency tire made in accordance with the principles of my invention, mounted on a wheel rim, the part A being shown in center section, and the part B showing the brackets turned to the proper positions for applying the tire to and removing it from the rim. Fig. 2 is an enlarged transverse sectional elevation on the plane indicated by the line 2 in Fig. 3, which is a plan view, with a dotted outline of the position to which the bracket is shifted when applying the tire to or removing it from the rim, the retaining ring for the brackets not being shown in this view. Fig. 4 is a sectional elevation of one of the brackets on a plane indicated by the line 4 in Fig. 2. Fig. 5 is a similar view of the key bracket, with wedge and locking bolt. Figs. 6 and 7 are views of the wedge. Fig. 8 is a sectional elevation on a plane indicated by the line 8 in Figs. 2 and 9 of the heads of the locking ring and the bolt for drawing them together. Fig. 9 is a view of one of the heads, taken as indicated by the arrow 9 in Fig. 8. Fig. 10 is a view of another form of bracket, this one being adapted for clencher rims, the form shown in the previous figures being adapted for Dunlop, or straight, flange rims.

Similar reference characters indicate like or similar parts throughout the several views.

15 is a steel channel and 16 the rubber tread comprising the tire proper, it being understood that the remaining parts are for the purpose of building up between the rim and this tire.

Secured to the channel, by swaging, and extending inwardly therefrom, are the bolts 17, 17 to which brackets are swiveled. Each bracket comprises an outer end plate 18 provided with a hole 19 for the bolt, two legs 22, 22, and a bottom connecting plate 23. The bracket is swiveled to the bolt and held in place by the nut 20 and lock washer 21. Each bracket is also provided with the lugs 24, 24, which are adapted to bear against the side flanges of the rim, and the corners are dubbed off, as shown at 25, 25 so that the brackets may be turned. Each bracket is dished or concaved in the bottom between the lugs, as shown at 26. Any suitable number of these brackets may be used, they being placed equidistantly apart, each swiveled to the tire, and extending radially and inwardly.

To apply the emergency tire to the rim 11, the retaining ring 14 and the near flange 13 having been removed from the rim, the brackets are turned lengthwise of the tire and rim, as indicated at B in Fig. 1 and in the dotted outline in Fig. 3. The emergency tire is then slipped onto the rim, the concaves 26 in the bottoms of the brackets, extending lengthwise of the rim, allow ample room for this operation. The rim flange 13 and the retaining ring 14 are then replaced.

The brackets are then all turned to their positions transversely of the rim, as shown in Fig. 2, which operation brings them to a snug fit between the flanges, the dubbed-off corners 25 permitting this movement and snug fit. The concave being now turned cross-wise of the rim, the looseness which existed when the concaves extended lengthwise of the rim is taken up, thus securing a proper compression between the tire and the rim to hold the emergency tire in position. To remove the emergency tire, the operation is reversed.

I use the key bracket which is shown in Fig. 5, and which is similar to the other brackets, except that it has a hole 27 in its bottom plate, in connection with a bolt 28 which is passed through the rim and felly through the valve-stem hole, and the nut 30 and lock washer 29. In order to take up any looseness which might exist in the emergency tire, I insert a wedge 31 under the key bracket, this wedge being provided with a slot 33 to encompass the bolt and a flange 32 bearing against the bracket.

To prevent the brackets from turning back from the proper transverse positions, when on the rim, I use a draw locking ring 34 that is wedge shaped in cross section and terminates in two laterally projecting lugs 35, 36, which are drawn together by means of the bolt 38 which is threaded through the lug 35 and fits loosely in the lug 36, so that by placing the locking ring between the flange and the sides of the brackets, as shown in the drawings, and then drawing up the ends by turning the bolt, the brackets will be positively prevented from turning. For a clencher type rim, I use a bracket the lugs 40, 40 of which are so shaped as to fit in the beads of the wheel rim.

What I claim is:

1. In an emergency tire, adapted for use in conjunction with a quick-detachable or equivalent type of rim, the combination of a channel carrying a tread member, a series of radially rigid brackets swiveled to said channeled rim and extending inwardly therefrom, each bracket being formed to fit snugly between the flanges of said rim when the bracket is turned crosswise and loosely when turned lengthwise of the same and being also longitudinally concaved (in its lengthwise position), a bolt securing one of said brackets to the rim and felly, a locking ring that is wedge-shaped in cross-section adapted to fit between the sides of said brackets and one of the rim flanges and having outwardly projecting lugs at its ends, and a draw-bolt engaging said lugs.

2. In an emergency tire, the combination with the tire proper, of a series of inwardly extending and radially rigid brackets swiveled to said tire, said brackets being formed to fit snugly between the flanges of a wheel rim when turned crosswise and loosely when turned lengthwise of said rim, and being also formed with concaves in a direction corresponding with the periphery of the wheel rim when the brackets are in a lengthwise position, said concaves affording means for radially clamping the tread portion to the wheel rim.

3. In an emergency tire, the combination with the tire proper, of a series of inwardly extending and radially rigid brackets swiveled to said tire, said brackets being formed to fit both lengthwise and crosswise of said rim, and having their bottoms formed with concaves extending lengthwise of the wheel rim when the brackets are in lengthwise position, said concaves affording means for radially clamping the tread portion to the wheel rim, a locking ring that is wedge-shaped in cross-section and formed to fit between the sides of said brackets and one of the wheel rim flanges and having outwardly projecting lugs at its ends, and a draw-bolt engaging said lugs.

4. In an emergency tire adapted for use in conjunction with a quick-detachable or equivalent type of rim, the combination of an outer rim and a series of radially and inwardly extending brackets swiveled to said rim, each bracket being inexpansible radially and being formed at its outer end to bear against said outer rim and at its inner end to bear against the face and between the flanges of a wheel rim.

In testimony whereof I have affixed my signature in presence of two witnesses.

SAMUEL DAVIDSON.

Witnesses:
GEO. H. KIRCHNER,
EDWARD GERSTED.